United States Patent [19]

Koves et al.

[11] Patent Number: 5,209,908

[45] Date of Patent: May 11, 1993

[54] RADIAL FLOW REACTOR WITH DOUBLE PERFORATED SCALLOPS

[75] Inventors: William J. Koves, Hoffman Estates; Roger L. Throndson, Schaumburg; Kenneth D. Peters, Elmhurst, all of Ill.

[73] Assignee: UOP, Des Plaines, Ill.

[21] Appl. No.: 729,977

[22] Filed: Jul. 15, 1991

Related U.S. Application Data

[63] Continuation-in-part of Ser. No. 412,051, Sep. 25, 1989, abandoned.

[51] Int. Cl.⁵ .................... B01J 8/02; C01G 11/00
[52] U.S. Cl. .................... 422/218; 422/216; 422/219; 422/191; 422/221; 208/113; 208/134
[58] Field of Search .................... 422/216–219, 422/188, 191, 193, 194, 221, 223, 239; 208/113, 134, 165

[56] References Cited

U.S. PATENT DOCUMENTS

| | | | |
|---|---|---|---|
| 2,614,033 | 10/1952 | Cornell et al. | 422/218 |
| 2,634,194 | 4/1953 | Nebeck | 422/218 |
| 3,167,399 | 1/1965 | Hansen, Jr. | 422/218 X |
| 4,110,081 | 8/1978 | Millar et al. | 422/216 X |
| 4,167,553 | 9/1979 | Persico et al. | 422/216 |
| 4,250,019 | 2/1981 | Peters | 208/165 X |
| 4,567,023 | 1/1986 | Greenwood et al. | 422/219 X |

Primary Examiner—Robert J. Warden
Assistant Examiner—Christopher Y. Kim
Attorney, Agent, or Firm—Thomas K. McBride; John G. Tolomei

[57] ABSTRACT

A fluid solid-contacting device eliminates the accumulation of deposits behind distribution collection conduits, reduces the differential expansion between the conduits and a containment vessel, and improves fluid distribution by extending the perforations into a back side of a distribution conduit that abuts the vessel. This apparatus has greatest application to scallop-shaped conduits that are commonly used in radial flow reactors. The perforations, extended into the back side of the scallop, ventilate the area between the scallop and the vessel holding the scallops.

4 Claims, 3 Drawing Sheets

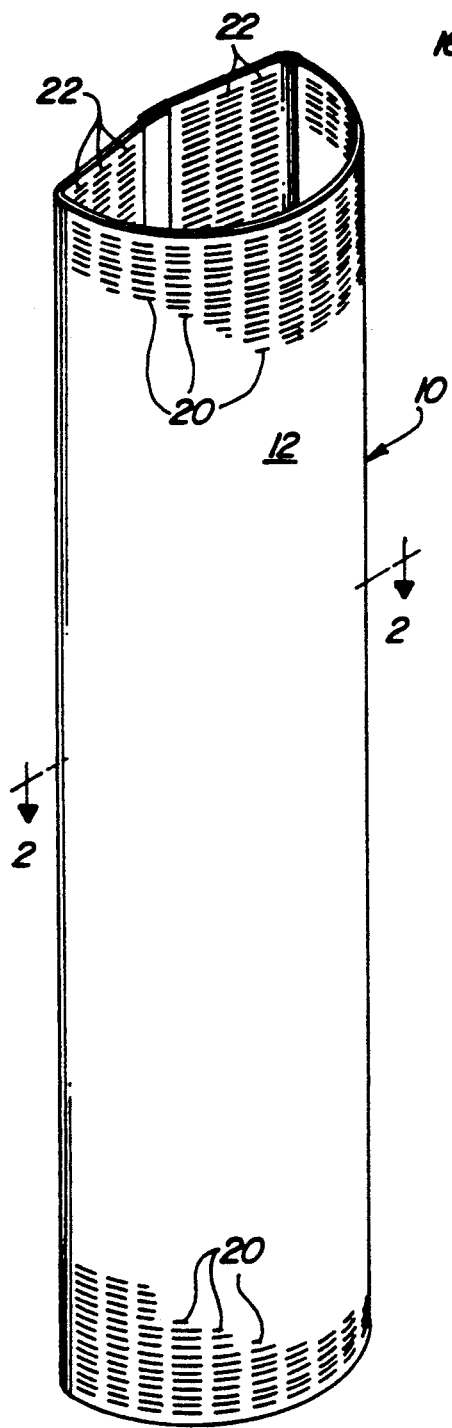
Fig. 1
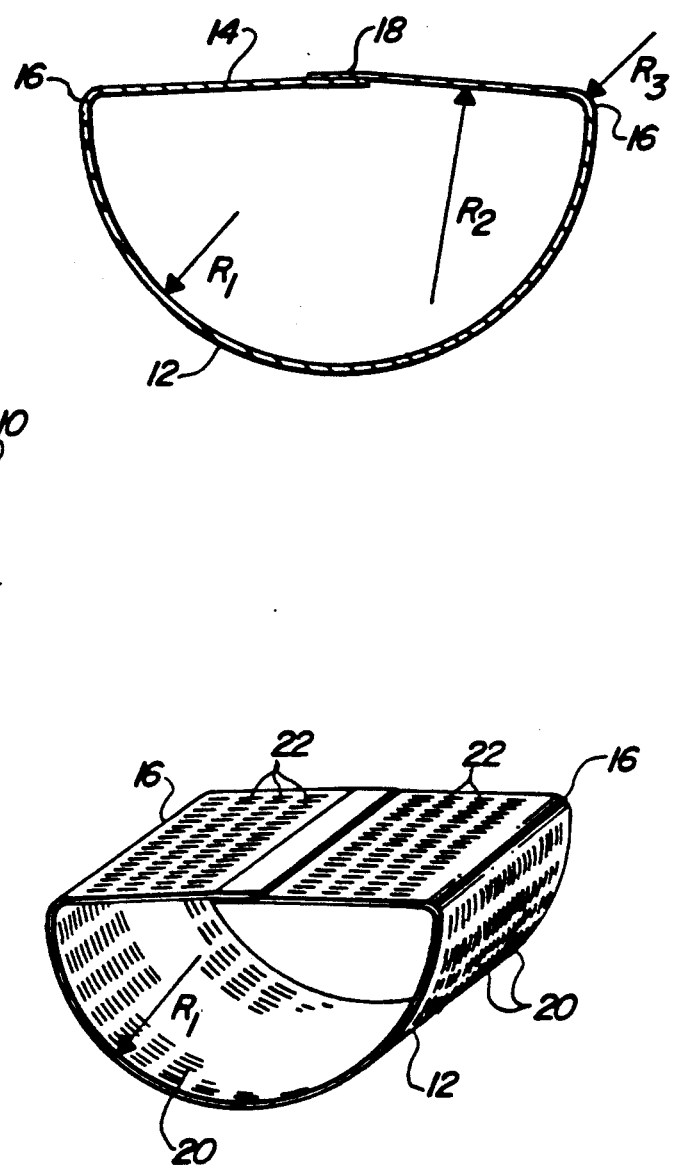
Fig. 2
Fig. 3

RADIAL FLOW REACTOR WITH DOUBLE PERFORATED SCALLOPS

CROSS-REFERENCE TO RELATED APPLICATION

This application is a continuation-in-part of U.S. Ser. No. 412,051 filed on Sep. 25, 1989 now abandoned.

FIELD OF THE INVENTION

This invention relates generally to the contacting of fluids and particulate materials. Specifically this invention relates to the internals of reactors for fluid particle contact. More specifically this invention relates to the design of shallow profile conduits for the radial distribution or collection of gases in fluid particle contacting.

BACKGROUND OF THE INVENTION

Numerous processes use radial flow reactors to effect the contacting of particulate matter with a gaseous stream. These processes include hydrocarbon conversion, adsorption, and exhaust gas treatment. These reactors contain a vertically extending annular bed of particles through which the gases flow in an inward or outward direction. The annular bed is formed by an outer screen element located along the outer diameter of the particle bed and an inner screen element located along the inner diameter of the particle bed. The outer screen element often consists of a series shallow profile closed conduits having an oblong cross-section that circles the outside of the particle bed and borders the inside of the particle containing vessel. The outer screen element can also be provided by a cylindrical screen or basket structure that retains particles in its interior and provides a gas distribution space about its exterior. This invention does not apply to such cylindrical screen or basket arrangements. One familiar geometry for the oblong conduits has a scallop shaped cross-section and such conduits are hereinafter referred to as scallops. Scallops are preferred in many applications due to lower cost and simplicity of design as compared to many continuous screen designs. The conduits have the oblong or scallop shape so that the backs of the conduits will fit closely against the wall vessel thereby minimizing the volume between the back of the conduit and the vessel and maximizing the central bed volume of the vessel.

Unfortunately, the space between the vessel wall and conduits or scallops cannot be completely eliminated and such reactors in some applications suffer from problems of support crushing and/or coke accumulation between conduits or scallops and between the back of the scallop or conduit and the vessel wall. Both of these problems stem in part from the closed structure of the scallop and its placement against the wall of the contacting vessel which still leaves the small space between the back of the scallop or vessel and the reactor wall. Crushing of scallop supports occurs when the scallops are supported by the vessel wall and hot vapor first enters or leaves the vessel thereby quickly heating the relatively thin scallops which expand rapidly while the vessel wall, which is not in direct contact with the vapor, expands at a much slower rate thereby crushing the scallop supports. Since direct vapor flow does not reach the space between the back of the scallops and vessel wall, catalyst between scallops also remains relatively inactive since the vapor tends to flow primarily out of the front face of the scallop. As a result, these spaces remain inactive or dead so that solid deposits can accumulate behind or between the scallops. These deposits include reaction products and reaction by-products. One such deposit is coke that commonly forms in reforming reactions. In extreme cases, coke deposits have pushed scallops away from the wall of reforming reactors.

It is an object of this invention to provide a distribution/collection conduit for a particle contacting vessel that will diminish or eliminate the above mentioned problems.

It is also an object of this invention to provide a fluid particle contacting process that will diminish or eliminate the above-mentioned problems.

More specifically, it is an object of this invention to alleviate or prevent damage to scallops and scallop supports in reforming reactors.

As a further object, this invention seeks to improve flow distribution in a fluid particle contacting vessel.

BRIEF STATEMENT OF THE INVENTION

This invention solves the problems of conduit damage and deposit accumulation by ventilating the back portion of the distribution/collection conduits that face the vessel wall. The back of the distribution/collection conduits may be ventilated by providing holes in the area between the distribution/collection conduits and the vessel wall thereby eliminating the dead space. The flow of hot gas to the back of the distribution/collection conduits prevents coke accumulation and heats the vessel wall. The flow of fluids to the back of the distribution/collection conduits can also give better fluid distribution to the particle bed by providing fluid flow from between the distribution/collection conduits.

Accordingly in a broad embodiment this invention is an apparatus for contacting particles and fluid. The apparatus includes a vessel having a fluid inlet and a fluid outlet and a distribution/collection conduit located inside the vessel. The distribution/collection conduit has a hollow interior, a vertically extended conduit with a horizontally extending back side proximate to at least one wall of the vessel, at least one end communicating with the fluid inlet or the fluid outlet, a plurality of perforations extending through and defined by the extended back side of the distribution/collection conduit, and a front side facing the interior of the vessel. A particle retaining space, for retaining particles, is enclosed by the vessel. The particle retaining space communicates with the plurality of perforations and the fluid inlet or fluid outlet.

In a more specific, embodiment this invention is a radial flow vessel for contacting particles and a fluid. The vessel has a fluid inlet, a fluid outlet and a plurality of vertically extending scallops arranged circumferentially about the interior of the vessel. The scallops have a hollow interior, a horizontally extended back side proximate to the wall of the vessel, at least one end communicating with the fluid inlet or the fluid outlet, a plurality of perforations extending through and defined by the back side of the scallop, and a front side facing the interior of the vessel. A perforated central conduit is located in the center of the vessel and communicates with the fluid inlet or fluid outlet. A particle retaining space, located in the vessel for retaining particles, is defined by the vessel, the central space, and/or the scallops. The retaining space communicates with the perforations and the central conduit.

In another aspect, this invention is an improved method of contacting a fluid with particles wherein fluid is passed from a fluid inlet to a fluid outlet through a bed of particles retained in a vessel. The fluid is distributed to or collected from the particle bed by at least one vertically extending oblong conduit or scallop and at least one side of the scallop or conduit is positioned against the wall of said vessel. The method is improved by passing a portion of the fluid through a plurality of apertures in the side of the scallop adjacent the vessel to maintain fluid flow between the side of the scallop and the vessel wall.

Other embodiments, objectives and details of this invention are disclosed in the following detailed description of the invention.

BRIEF DESCRIPTION OF THE DRAWINGS

FIG. 1 is a view of a single, scallop-type, distribution/collection conduit.

FIG. 2 is a cross-sectional view of the scallop of FIG. 1.

FIG. 3 is an isometric view of a portion of a scallop featuring a view of the back of a scallop.

DETAILED DESCRIPTION OF THE INVENTION

Figure 4:
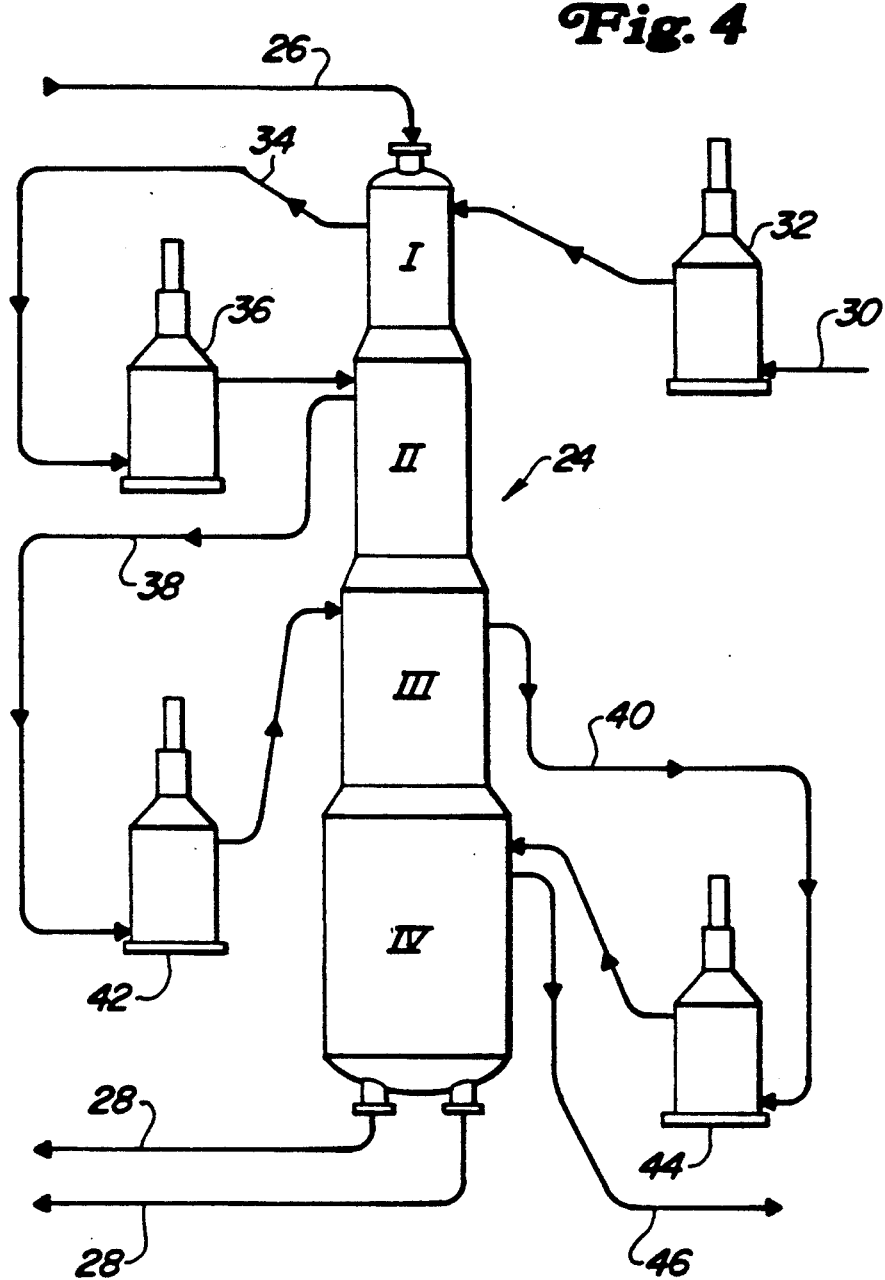
FIG. 4 is a schematic view of a stacked reactor system.

This invention can be applied to any fluid-particle contacting apparatus or process that uses extended conduits, positioned within a containment vessel and adjacent to or against the vessel wall of the vessel, for distributing or collecting fluid from a particle bed. The vessel can be a reactor or any type of contacting vessel and this invention is not limited to any specific type of process or vessel arrangement. This apparatus or process will be useful in processes where the presence of stagnant areas or dead spaces,—i.e., regions having reduced fluid flow-are detrimental to the process, transient temperature gradients or temperature fluctuations are imposed on the vessel internals, or more uniform distribution of the fluid to the particles is desired. The conduits may be arranged in the vessel to provide radial flow or cross flow through the bed of particles. There is also no limitation to the direction of flow produced by the conduits. The only restriction on conduit location is that conduits are placed near or against the wall of the containment vessel.

The distribution/collection conduits, to which this invention may be applied, can take on a variety of shapes. Conduits having rectangular, oblong, square or arcuate cross-sections can be used for fluid distribution or collection. One type of commonly used conduit, called a scallop, was previously mentioned. FIG. 1 shows a single vertically-oriented scallop 10. FIG. 2 shows the usual cross-section of a scallop which typically has an extended front side or section 12 defined by a radius $R_1$, an extended back side or section 14 defined generally by a large radius $R_2$, and two small radius knuckle sections 16 that join the front and back sections in continuous transition through a radius $R_3$. FIG. 2 also shows the construction of the scallop from a single sheet of material that is rolled to the desired shape and welded along joint 18 which can be a lap joint or a butt joint.

The conduits are perforated to distribute or collect gases from a bed of particles disposed within the vessel. In many cases, the conduits retain a portion of the particles and define one or more sides of the particle bed. In such cases, each conduit is perforated to communicate its interior with the particle bed-perforations are kept small enough to prevent migration of the particles into the scallops. FIG. 1 shows perforations 20 on the front 12 of scallop 10. The geometric of the scallops and the containment vessel has typically produced a relatively tight clearance between the back of the scallop and the vessel wall. In almost all such arrangements the backs of the scallops are less than two inches from the vessel wall and usually less than one inch from the vessel wall. Thus, the previous practice in fluid-solid contacting devices has been to place the back of the scallop against the vessel wall and only perforate the front portion of the conduits that faced the particle bed. The use of perforations on the back side of the scallops, in accordance with this invention, is shown in FIG. 3 by reference numeral 22 and provides the previously discussed advantages.

FIGS. 2 and 3 show a relatively uniform spacing of perforations across the front and back of the scallop. A uniform spacing is not essential to the practice of this invention. Pressure drop and distribution considerations may show that an increased number of perforations on the front or back of the scallops would provide an advantage. In fact, in some instances, the perforations on the front of the scallops may be eliminated altogether. The fronts and the backs of the conduits and scallops are often referred to as being horizontally extended. The description of a horizontal extension refers to the front and back faces having a projected dimension from the sides of the conduit that is at least one third the depth of the conduit or scallop. As best demonstrated by FIG. 3, no perforations extend into the knuckle section of the scallop. The knuckle section of a scallop often experiences high stresses, therefore, structural considerations usually dictate the absence of perforations from the knuckle section.

The arrangement and modification of the distribution/collection conduits and the resulting advantages in the collection or distribution of fluids can be more readily appreciated from and will be further described in the context of an apparatus and process for reforming hydrocarbons. The description of this invention, in the limited context of a specific apparatus and process, is not meant to restrict the broad application of this invention to any specific apparatus or process for fluid solid contacting.

The catalytic reforming process is well known in the art. A hydrocarbon feedstock and a hydrogen-rich gas are preheated and charged to a reforming zone containing typically two to five reactors in series.

The hydrocarbon feed stream that is charged to a reforming system will comprise naphthenes and paraffins that boil within the gasoline range. The preferred class includes straight-run gasolines, natural gasolines, synthetic gasolines, and the like. As an alternative embodiment, it is frequently advantageous to charge thermally or catalytically cracked gasolines or partially reformed naphthas. Mixtures of straight-run and cracked gasoline-range naphthas can also be used to advantage. The gasoline-range naphtha charge stock may be a full-boiling gasoline having an initial boiling point of from about 40°–70° C. and an end boiling point within the range of from about 160°–220° C., or may be a selected fraction thereof which generally will be a higher-boiling fraction commonly referred to as a heavy naphtha-for example, a naphtha boiling in the range of 100°-200° C. In some cases, it is also advantageous to charge pure hydrocarbons or mixtures of hydrocarbons that have been recovered from extraction unit-for example, raffinates from aromatics extraction or straight-chain paraffins-which are to be converted to aromatics.

Operating conditions used for reforming processes usually include a pressure selected within the range of about 100-7000 kPa (abs), with the preferred pressure being about 350-4250 kPa (abs). Particularly good results are obtained at low pressure, namely a pressure of about 350-2500 kPa. Reforming conditions include a temperature in the range from about 315° to about 600° C. and preferably from about 425° to about 565° C. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product.

The reforming conditions in the present invention also typically include sufficient hydrogen to provide an amount of about 1 to about 20 moles of hydrogen per mole of hydrocarbon feed entering the reforming zone, with excellent results being obtained when about 2 to about 10 moles of hydrogen are used per mole of hydrocarbon feed. Likewise, the liquid hourly space velocity (LHSV) used in reforming is selected from the range of about 0.1 to about 10 $hr^{-1}$, with a value in the range of about 1 to about 5 $hr^{-1}$ being preferred.

A multi-functional catalyst composite is usually employed in catalytic reforming which contains a metallic hydrogenation-dehydrogenation component on a porous, inorganic oxide support which provides acid sites for cracking and isomerization. Most reforming catalyst is in the form of 1/16" to 3/16" spheres or cylinders. Catalyst composites comprising platinum on highly purified alumina are particularly well known in the art. Those of ordinary skill in the art are also aware of metallic modifiers, such as rhenium, iridium, tin, and germanium which improve product yields or catalyst life in platinum-catalyst reforming operations.

The principal reactions that take place are the dehydrogenation of naphthenes to aromatics, dehydrocyclization of paraffins, isomerization of paraffins and naphthenes, hydrocracking of paraffins to light hydrocarbons, and formation of coke which is deposited on the catalyst. Coke is formed as a by-product of these reactions and deposits on the catalyst thereby causing the catalyst to lose activity.

A reforming reaction section provides a good example of a fluid solid contacting apparatus that often employs scallops for gas distribution. Many reforming section operate with the continuous addition and withdrawal of catalyst particles through a series of radial flow reactors. FIG. 4 shows such a reaction section for the reforming of hydrocarbons. The reaction section contains a series of four reactors arranged vertically in a stacked reactor vessel 24. The individual reactors are identified by numerals I-IV. Catalyst particles enter the top of the stacked reactor arrangement through catalyst transfer line 26 and pass through the series of four reactors under gravity flow. After passage through each reactor section, the catalyst particles are withdrawn from the bottom of reactor IV by one or more catalyst withdrawal lines 28. Catalyst withdrawn by lines 28 is regenerated by the oxidation of code deposits in a regeneration zone. After regeneration the catalyst particles are again returned to the process by line 26.

The hydrogen and hydrocarbon feed pass through the four reactors. The feed first enters the process through a line 30 and pass through a heater 32 to raise its temperature before entering reaction zone I. Partially converted feed is collected from the top of reaction zone I by a line 34, passed through an interstage heater 36 and into reaction zone II. Intermediate reactor lines 38 and 40 carry the partially converted feed through reaction zones III and IV with interstage heaters 42 and 44 supplying heat for the reactions therein. The reformate product is recovered from reaction zone IV by a product line 46.

Figure 5:
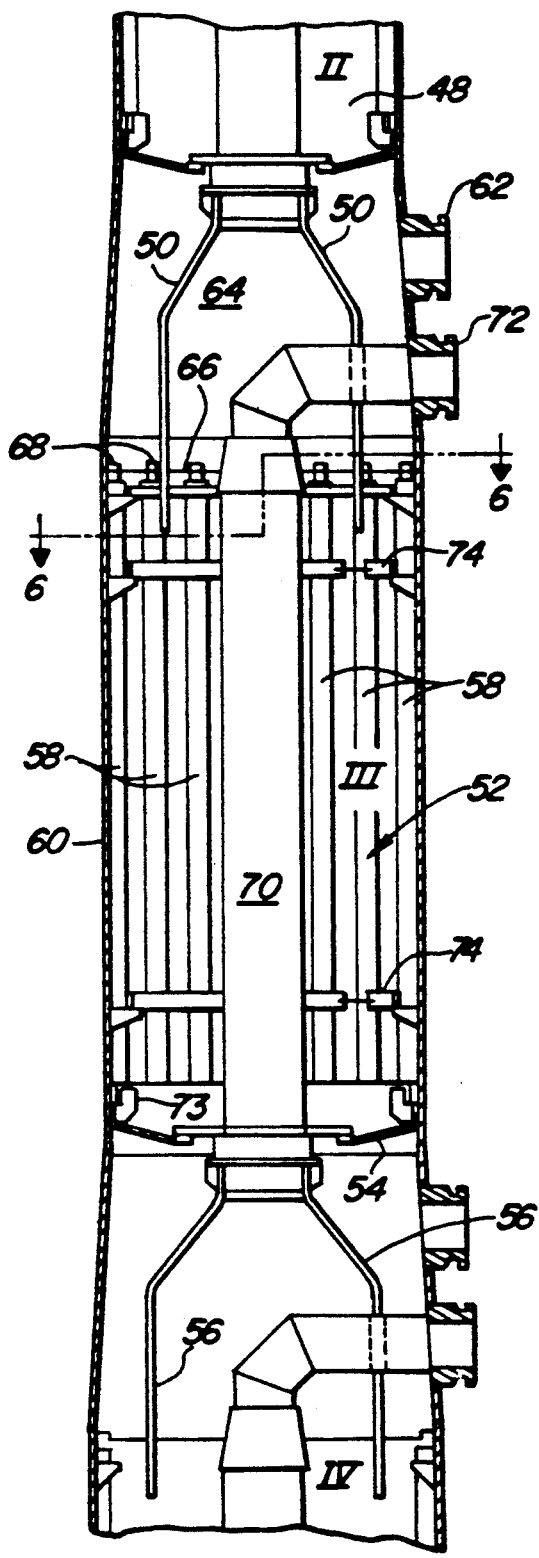
FIG. 5 is a partial sectional view of FIG. 4.

As the catalyst passes from reactor to reactor, it is detained in a catalyst bed in each reactor. The arrangement of the internals for forming the catalyst bed and effecting the gas solid contacting is shown by FIG. 5. FIG. 5 shows a sectional view of reaction zone III, but is representative of intermediate reaction II as well. Catalyst particles (not shown) are transferred from a particle retaining space 48 by a series of transfer conduits 50 into a particle retaining space 52 in reaction zone III. A bed of catalyst particles are formed in retaining space 52 immediately below the lower extent of transfer conduits 50. The lower extent of retaining space 52 and the catalyst bed is defined by a head 54. A series of scallops 58 and the wall 60 of stacked reactor 24 define the outer extent of the catalyst bed in retaining space 52. Catalyst particles are withdrawn from the bottom of retaining space through another series of transfer conduits 56 that transfer the particles into reaction zone IV for ultimate removal from the stacked reactor.

The reactant stream enters reaction zone III through a nozzle 62 and flows into a distribution chamber 64. A cover plate 66 extends across the bottom of chamber 64 to separate it from retaining space 52. Chamber 64 communicates the reactants with the interior of the scallops through a series or risers 68 that extend through cover plate 66. The reactants pass across retaining space 52 and are collected by a central conduit 70 that defines the inner boundary of the catalyst bed. Conduit 70 has a closed bottom and transports the effluent vapors from retaining space 52 upward and out of the stacked reactor 24 through a nozzle 72.

A bottom support 73 and an expansion ring 74 hold the scallops in place. Support 73 forms a rigid support for the bottom of the scallop. Although there is usually provision for a sliding fit between the riser 68 (at the top of the scallop) and cover plate 66, frictional forces can restrict relative movement between the scallops 58 and vessel wall 60. The scallops are made of relatively thin gauge material; therefore, when the reactor vessel is undergoing initial start-up, hot vapors entering the reaction zones first contact the scallops. As a result, the scallops heat up quickly. In contrast, the wall of the vessel receives little, if any, direct vapor contact and is heated much more slowly. This difference in heating time creates differences in expansion between the reactor and the scallop as previously described. By incorporating the perforations in the back of the scallops, a direct flow of hot vapors also contacts the vessel wall to eliminate or reduce the differential expansion between the scallops and the vessel wall.

Figure 6:
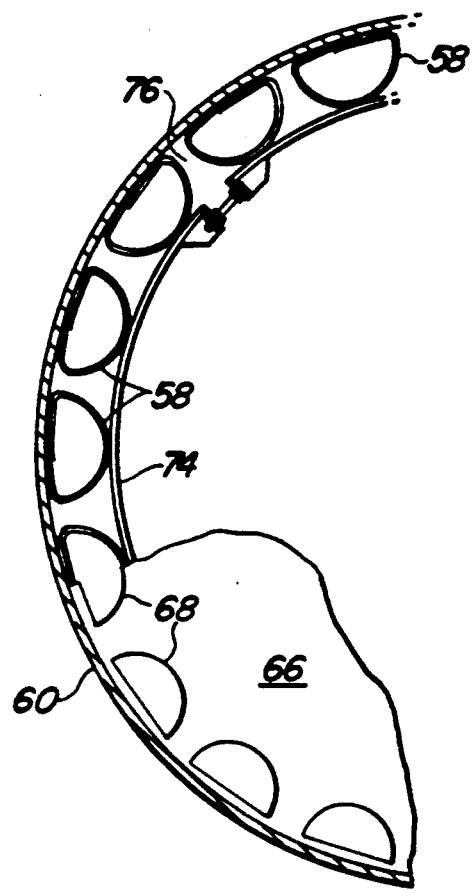
FIG. 6 is a split section of FIG. 5 showing a plan of a scallop arrangement.

Scallops 58, as further seen in FIG. 6, ring the inside of vessel wall 60. The expansion ring 74 abuts the front 12 of the scallops and holds the scallops against the wall of the vessel wall. The depth of the scallops in FIG. 6 equals the radial distance between the ring and the vessel wall. FIG. 6 also demonstrates how the backs of the scallops 14 closely match the curvature of the vessel wall 60 so that there is little space between the back of the scallop and the vessel wall. Nevertheless, there is inevitably some small amount of space behind the scallops. Without the perforations of this invention, the space behind the scallops and next to the knuckle sections are good sites for coke deposits to form due to the lack of catalyst or vapors circulation and cooler temperatures at the outside of the catalyst bed, especially near the reactor wall. Perforations on the back of the scallops serve a dual function in alleviating coking by making the area behind the scallops active, with respect to vapor flow, and eliminating any cold spots behind the scallops.

FIG. 6 also depicts the usual spacing 76 that is found between scallops. This spacing creates vertical band between the scallops where no vapor flow is distributed to the catalyst bed. Perforating the back of the scallops provides vapor flow into space 76, thereby distributing vapor to the space between the scallops and creating a more complete vapor distribution about the entire circumference of the reaction zone.

In stacked reactor arrangements, and particularly in reforming reactors, it is usually desirable to limit pressure drop across the different stages. Furthermore, in fluid particle contacting in general, it is preferred to avoid excessive pressure drop through fluid distributors. Appreciable pressure drops will form fluid jets that can impinge upon and damage the contacted particles.

In order to practice this invention, it is not necessary for the open area of the perforations in the scallops or conduits in general to be sized for any positive pressure drop. Accordingly, the practice of this invention will not present pressure drop penalties or particle attrition problems.

We claim:

1. In a method of contacting a fluid with solid particles wherein fluid is passed through a vertically arranged and elongated vessel having a fluid inlet and a fluid outlet and retaining therein a bed of particles, said fluid is distributed to or collected from said particles by at least one longitudinally extending conduit, said conduit has an oblong shape and a horizontally extended back side and at least said horizontally extended back side is positioned against the wall of said vessel; said improvement comprising passing a portion of said fluid through a plurality of apertures in said horizontally extended back side of said conduit to maintain fluid flow between said horizontally, extended back side of said conduit and said vessel wall to prevent at least one of coking between said vessel wall and said conduit and transient thermal gradients between said vessel wall and said conduit.

2. The method of claim 1 wherein said particles are a hydrocarbon conversion catalyst, and said fluid is a gaseous stream comprising hydrocarbons.

3. The method of claim 2 wherein said vessel is a reactor, said fluid is a gaseous stream comprising naphthenes, and said fluid contacts said particles at conditions effective to convert said naphthenes into aromatics.

4. The method of claim 3 wherein said fluid is distributed from said conduit and collected from the center of said vessel.

* * * * *